US009563601B2

(12) United States Patent
Sato

(10) Patent No.: US 9,563,601 B2
(45) Date of Patent: Feb. 7, 2017

(54) FORCE SENSOR CORRECTING METHOD

(75) Inventor: Shuuichi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 917 days.

(21) Appl. No.: 13/704,958

(22) PCT Filed: Jun. 7, 2011

(86) PCT No.: PCT/JP2011/063440
§ 371 (c)(1),
(2), (4) Date: Dec. 17, 2012

(87) PCT Pub. No.: WO2012/002137
PCT Pub. Date: Jan. 5, 2012

(65) Prior Publication Data
US 2013/0090880 A1    Apr. 11, 2013

(30) Foreign Application Priority Data

Jun. 30, 2010 (JP) ................................. 2010-150245

(51) Int. Cl.
*G06F 17/00* (2006.01)
*G01L 25/00* (2006.01)
(Continued)

(52) U.S. Cl.
CPC .............. *G06F 17/00* (2013.01); *B25J 9/1682* (2013.01); *B25J 9/1694* (2013.01); *B25J 13/085* (2013.01);
(Continued)

(58) Field of Classification Search
CPC ....... B25J 9/1682; B25J 9/1694; B25J 13/085; G06F 17/00; G05B 2219/39058; G05B 2219/40586; G05B 2219/39051
(Continued)

(56) References Cited

U.S. PATENT DOCUMENTS 4,620,436 A * 11/1986 Hirabayashi ........... B25J 9/1692
73/1.15
4,699,414 A * 10/1987 Jones ..................... B25J 15/026
294/119.1

(Continued)

FOREIGN PATENT DOCUMENTS

DE    19960482 A1    6/2001
JP    11-237296 A    8/1999

OTHER PUBLICATIONS

R. C. Bonitz, et al., "Calibrating a multi-manipulator robotic system", IEEE, 1997.*

(Continued)

*Primary Examiner* — Gregory J Toatley
*Assistant Examiner* — Michael Dalbo
(74) *Attorney, Agent, or Firm* — Fitzpatrick, Cella, Harper & Scinto

(57) ABSTRACT

The present invention provides a force sensor correcting method which is simple and capable of performing correction, with the force sensor remaining mounted at the end of an arm without an exchange of an end effector. In the present invention, a force sensor 1 of one robot 101 has already been corrected, and a force sensor 2 of the other robot 102 is an object to be corrected. First, hands 3a, 3b of a pair of robots 101, 102 are made to abut on each other (abutting step). A detected signal of the corrected force sensor 1 of the one robot 101, generated by execution of the abutting step, is converted into a measured value indicating a force or a moment (measurement step). Based on the measured value obtained in the measurement step, a value indicating a force or a moment acting on the hand 3b of the other robot 102 due to a reaction generated by the abutting step is obtained (calculation step). The conversion data is updated such that a detected signal, outputted by the force sensor 2 as the object to be corrected of the other robot 102 in the abutting (Continued)

step, is converted into an identical value to the value indicating the force or the moment obtained in the calculation step (correction step).

4 Claims, 5 Drawing Sheets

(51) Int. Cl.
  *B25J 9/00* (2006.01)
  *B25J 9/16* (2006.01)
  *B25J 13/08* (2006.01)

(52) U.S. Cl.
  CPC ............... *G05B 2219/39051* (2013.01); *G05B 2219/39058* (2013.01); *G05B 2219/40586* (2013.01)

(58) Field of Classification Search
  USPC .......................................................... 702/98
  See application file for complete search history.

(56) References Cited

U.S. PATENT DOCUMENTS

| | | |
|---|---|---|
| 5,021,728 A | 6/1991 | Sato |
| 5,162,721 A | 11/1992 | Sato |
| 5,693,871 A * | 12/1997 | Stout .................... G01L 27/005 73/1.09 |
| 6,382,012 B2 | 5/2002 | Hara et al. |
| 6,711,469 B2 * | 3/2004 | Sakamoto et al. ............ 700/245 |
| 8,365,615 B2 | 2/2013 | Sato et al. |
| 2005/0273198 A1 | 12/2005 | Bischoff |
| 2009/0105880 A1 * | 4/2009 | Okazaki ................. B25J 9/1633 700/258 |
| 2011/0084932 A1 * | 4/2011 | Simmons .............. G06F 3/0414 345/174 |

OTHER PUBLICATIONS

T. Arai, et all., "Automated Calibration of Robot Coordinates for Reconfigurable Assembly Systems", Elsevier, 2002.*
R. G. Bonitz and T. C. Hsia, "Calibrating a multi-manipulator robotic system," in IEEE Robotics & Automation Magazine, vol. 4, No. 1, pp. 18-22, Mar. 1997.*
Arai, "Automated Calibration of Robot Coordinates for Reconfigurable Assembly Systems", CIRP Annals—Manufacturing Technology, vol. 51, Issue 1, 2002, pp. 5-8.*
International Preliminary Report on Patentability dated Jan. 17, 2013 issued in corresponding PCT Patent Application No. PCT/JP2011/063440.
Bonitz., R., et al., "Calibrating a Multi-manipulator Robotic System," IEEE Robotics & Automation Magazine, pp. 18-22, Mar. 1997.

* cited by examiner

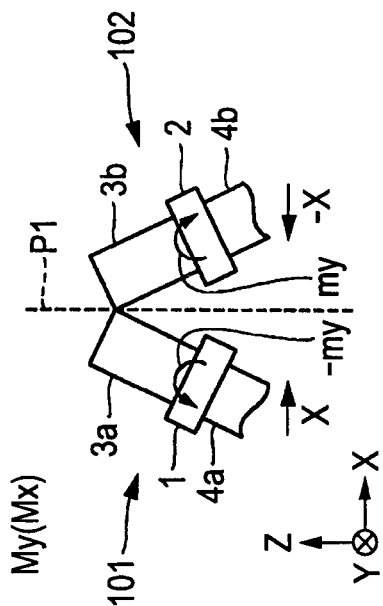
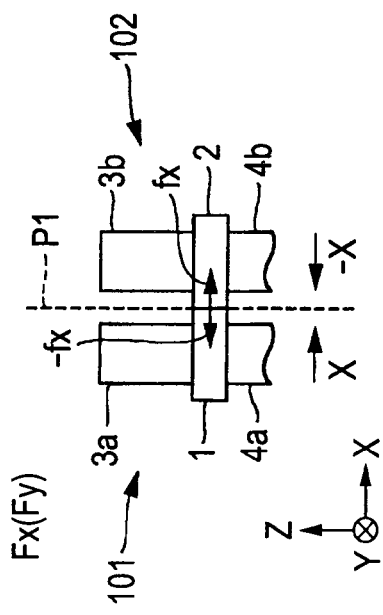
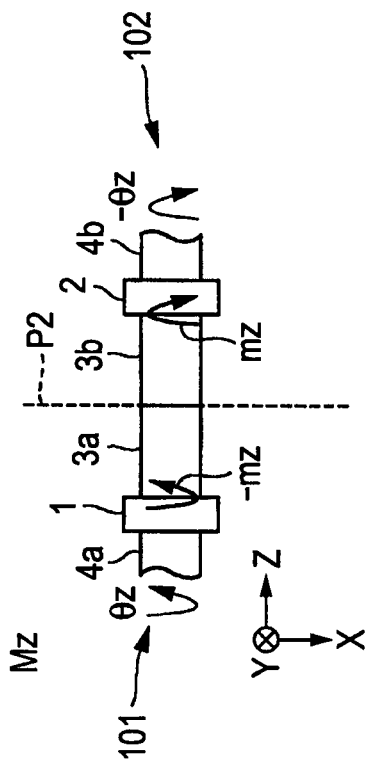
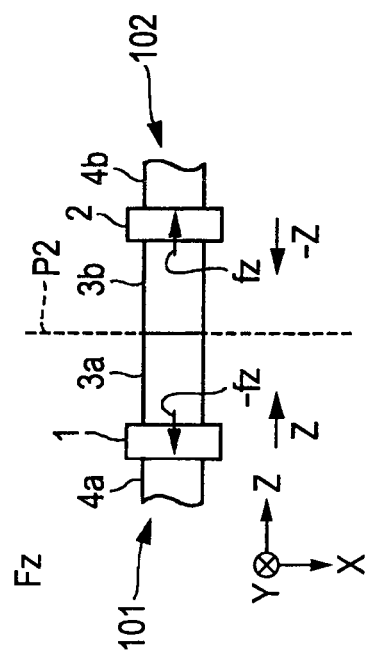

FORCE SENSOR CORRECTING METHOD

TECHNICAL FIELD

The present invention relates to a correcting method for a force sensor mounted in a robot in a robot system.

BACKGROUND ART

There is known an industrial robot system which includes a robot provided with an end effector such as a hand at the end of an arm via a force sensor. In this kind of robot system, in the case of the robot performing assembly of parts, a force or a moment component generated at a wrist portion at the time of an assembly operation is detected by the force sensor, to control a posture of the robot including the hand.

At the manufacturing stage of a force sensor, variations in output with respect to an external force occur, and hence the output needs to be corrected. Therefore, when the sensor is a six-axis force sensor, respective axes, such as forces Fx, Fy, Fz and moments Mx, My, Mz, are provided with a force by means of weights or the like, to perform correction based on the outputs. This corrected force sensor is mounted on the arm and used.

Meanwhile, when the robot mounted with the force sensor is in use, an excessive load may be erroneously applied, to cause occurrence of plastic deformation or the like, thereby leading to lower measurement accuracy. In that case, what has been done is to temporarily remove the force sensor from the arm and perform a re-correction operation, which requires time and trouble. As opposed to this, there has been proposed one that corrects a force sensor in a mounted state. For example, in Japanese Patent Application Laid-Open No. H11-237296, In PTL 1, first, reference data is previously acquired when the force sensor is normally functioning. Then, when the force sensor needs to be corrected, the correction is performed such that a posture of a robot is changed in a predetermined pattern, thereby to change a posture of the force sensor and obtain a changed amount of an output signal of the force sensor, which is compared with reference data and then updated. It is described that by the above manner, the correction can be performed with the force sensor remaining mounted in the robot.

However, in the foregoing conventional correcting method, the reference data needs to be acquired beforehand. Further, there has been a problem in that, when an end effector provided at the end of the arm is not the end effector at the time of acquiring the reference data, the end effector has to be exchanged, which requires time and trouble.

In recent years, a robot system provided with a pair of robots set so as to perform collaboration work has been proposed and a method for correcting a force sensor in a simpler manner in the case of a large number of robots has been desired.

Therefore, an object of the present invention is to provide a force sensor correcting method which is simple and capable of performing correction, with the force sensor remaining mounted at the end of an arm without an exchange of an end effector.

SUMMARY OF INVENTION

The present invention is a force sensor correcting method in a robot system which includes a pair of robots each having an arm and an end effector provided at the end of the arm via a force sensor, the method including an abutting step of making the end effectors of the pair of robots abut on each other, a measurement step of obtaining a first detected signal of the force sensor of one robot and a second detected signal of the force sensor of the other robot, generated by execution of the abutting step, and a correction step of updating conversion data of the other robot, which converts the second detected signal, outputted by the force sensor of the other robot, into a value indicating a force or a moment such that the second detected signal is converted into an identical value to a value indicating a force or a moment based on the first detected signal of the force sensor of the one robot.

According to the present invention, since the force sensor as an object to be corrected is corrected with the corrected force sensor taken as a reference, it is neither necessary to mount the end effector as a reference and acquire reference data beforehand, nor to exchange the end effector, thereby facilitating the correction.

Further features of the present invention will become apparent from the following description of exemplary embodiments with reference to the attached drawings.

BRIEF DESCRIPTION OF DRAWINGS

FIG. 2A is a view showing an example of a correcting method for a force Fx(Fy) in the force sensor.

FIG. 2B is a view showing an example of a correcting method of a moment My(Mx) in the force sensor.

FIG. 2C is a view showing an example of a correcting method for a force Fz in the force sensor.

FIG. 2D is a view showing an example of a correcting method of a moment Mz in the force sensor.

DESCRIPTION OF EMBODIMENTS

Figure 1:
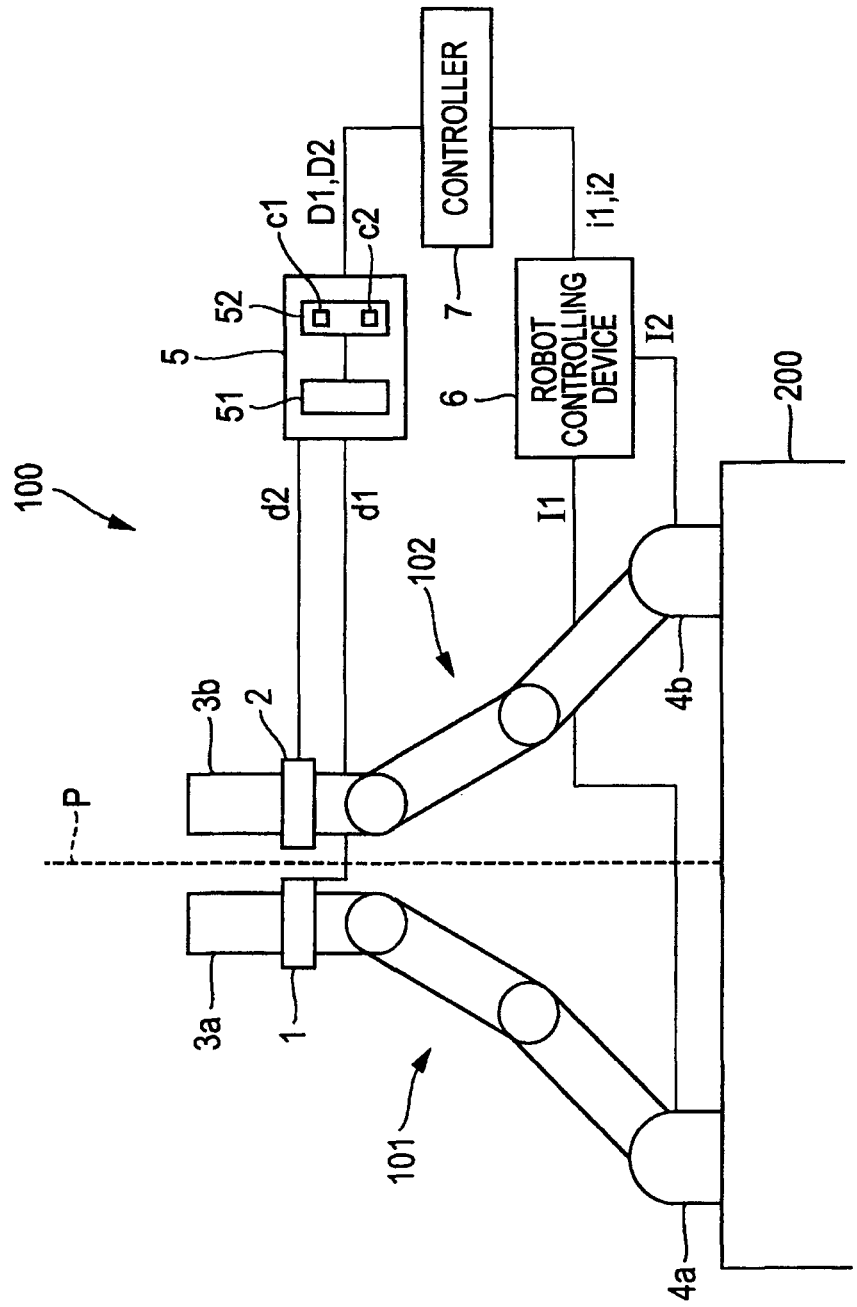
FIG. 1 is an illustrative view showing a schematic configuration of a robot system according to an embodiment of the present invention.

Thereinafter, an embodiment of the present invention will be described in detail with reference to the drawings. FIG. 1 is an illustrative view showing a schematic configuration of a robot system according to an embodiment of the present invention. As shown in FIG. 1, a robot system 100 includes a pair of robots 101, 102. Using the pair of robots 101, 102 enables a collaboration work. The pair of robots 101, 102 has an identical configuration, and is provided on a horizontal surface of a rack 200, plane-symmetrically to a virtual vertical surface P. One robot 101 has a multi-joint arm 4a, and a hand 3a as an end effector fitted to the end (wrist part) of the arm 4a via a force sensor 1. Further, the other robot 102 has a multi-joint arm 4b, and a hand 3b as an end effector fitted to the end (wrist part) of the arm 4b via a force sensor 2. Base ends of the respective arms 4a, 4b are fixed to the horizontal surface of the rack 200. The respective arms 4a, 4b are multi-joint ones each having a horizontal joint, a vertical joint, and the like, and each joint is provided with a driving unit such as a motor, not shown. Further, the robot system 100 includes a force measuring device 5, a robot controlling device 6, and a controller 7.

The force sensors 1, 2 are, for example, six-axis force sensors, and ones for detecting mutually orthogonal three force components Fx, Fy, Fz, and three moments Mx, My, Mz around the axes thereof. The respective force sensors 1, 2 have a plurality of detecting elements, not shown, and voltages as detected signals d1, d2 are outputted from the respective detecting elements. Hereinafter, the voltage outputted by the force sensor 1 is referred to as a first detected signal d1, and the voltage outputted by the force sensor 2 as a second detected signal d2.

The first detected signal d1 and the second detected signal d2 are inputted into the force measuring device 5. The force measuring device 5 has a calculating unit 51 that performs calculation to convert the inputted first detected signal d1 into a first measured value D1 as a value indicating a force or a moment based on first conversion data c1. Further, the force measuring device 5 has a storing unit 52 that stores the first conversion data c1 to convert the first detected signal d1 into the first measured value D1. That is, the calculating unit 51 reads the first conversion data c1 from the storing unit 52, to convert the first detected signal d1 into the first measured value D1. Further, the calculating unit 51 of the force measuring device 5 performs calculation to convert the inputted second detected signal d2 into a second measured value D2 as a value indicating a force or a moment based on second conversion data c2. Moreover, the storing unit 52 of the force measuring device 5 stores the second conversion data c2 to convert the second detected signal d2 into a second measured value D2. That is, the calculating unit 51 reads the second conversion data c2 from the storing unit 52, to convert the second detected signal d2 into the second measured value D2. The conversion data c1, c2 stored in the storing unit 52 are conversion parameters, such as a matrix, a conversion equation, a conversion table, and the like, for converting, for example, voltage values indicating the detected signals d1, d2 into the measured values D1, D2 indicating a force or a moment.

The controller 7 serves to exercise control all over the system, and based on the respective inputted measured values D1, D2, operation commands i1, i2 to the respective robots 101, 102 are outputted to the robot controlling device 6. The robot controlling device 6 is one that supplies currents I1, I2 corresponding to the operation command i1, i2 to the motors, not shown, provided in the robots 101, 102, to actuate the motors so as to actuate the robots 101, 102.

Incidentally, there are cases where the force sensors 1, 2 deteriorate due to an excessive load or a secular change, to cause lower accuracy, thus requiring correction. In the present embodiment, the force sensor 1 is the corrected force sensor, and the force sensor 2 is the force sensor as the object to be corrected. Herein, the corrected force sensor is a force sensor that has hardly deteriorated due to an excessive load or a secular change, and holds its accuracy. The force sensor 2 is a force sensor that has deteriorated due to an excessive load or a secular change, and is suspected to have lower accuracy. Hereinafter, there will be described a correcting method for the force sensor that updates the conversion data c2 for converting the detected signal d2, outputted by the force sensor 2 as the object to be corrected, into a value indicating force or a moment.

FIGS. 2A to 2D are views for illustrating the correcting method for the force sensor 2. Herein, the force sensors 1, 2 will be described as six-axis force sensors each being capable of detecting the force Fx in an X-axis direction, the force Fy in a Y-axis direction, the force Fz in a Z-axis direction, the moment Mx in the X-axis direction, the moment My in the Y-axis direction, and the moment Mz in the Z-axis direction.

1. Correcting Method for Force Fx(Fy)

FIG. 2A shows an example of a correcting method for the force Fx(Fy). First, the controller 7 actuates the pair of robots 101, 102 such that the hands 3a, 3b as the respective end effectors of the robots 101, 102 abut on each other via the robot controlling device 6 (abutting step). In this case, the pair of robots 101, 102 are activated such that the respective robots 101, 102 have plane-symmetrical postures with respect to a Y-Z plane (virtual plane) P1. Then, the robot 101 is moved in the X direction and the robot 102 is moved in the −X direction, to bring the hands 3a, 3b into contact with each other. At that time, magnitudes of the force Fx in the X-axis direction that occur in the force sensors 1, 2 are identical according to the law of action and reaction.

Next, the calculating unit 51 of the force measuring device 5 converts the detected signal d1 of the corrected force sensor 1 of the one robot 101, generated by execution of the abutting step, into the measured value D1 indicating the force Fx by use of the conversion data c1 (measurement step). In the case of FIG. 2A, the measured value D1 is −fx.

Next, based on the measured value D1 obtained in the measurement step, the calculating unit 51 of the force measuring device 5 obtains a value fx indicating the force Fx acting on the hand 3b of the other robot 102 due to a reaction generated by the abutting step (calculation step). Specifically, since the measured value D1 is −fx and fx is acting on the hand 3b by the reaction, the calculating unit 51 performs calculation for inverting the sign of the measured value D1, thereby to obtain the value fx.

Next, the calculating unit 51 of the force measuring device 5 updates conversion data c2 such that a detected signal d2, outputted by the force sensor 2 of the other robot 102 in the abutting step, is converted into an identical value to the value fx indicating the force Fx, obtained in the calculation step (correction step). Thereby, the force Fx of the force sensor 2 is corrected. Further, it is found that, when the arms 4a, 4b are rotated by 90° in the Z-axis direction, the force Fy of the force sensor 2 can also be corrected in the same manner as above.

2. Correcting Method for Moment My(Mx)

FIG. 2B shows an example of a correcting method for the moment My(Mx). In this case, as the abutting step, the robot 101 having the hand 3a mounted with the corrected force sensor 1 and the robot 102 having the hand 3b mounted with the force sensor 2 as the object to be corrected are moved so as to have plane-symmetrical postures at a predetermined angle with respect to the Y-Z plane P1. The arm 4a is moved in the X direction and the arm 4b is moved in the −X direction, to bring the hands 3a, 3b of both arms into contact with each other. With the contact having the predetermined angle, the force is generated in a place distant from the mounting surfaces of the force sensors 1, 2, and thereby, a moment −my is detected by the force sensor 1. Hereinafter, it is found that Mx and My can be corrected in the same manner as (1. Correcting method for Fx(Fy)).

That is, the calculating unit 51 of the force measuring device 5 converts the detected signal d1 of the corrected force sensor 1 of the one robot 101, generated by execution of the abutting step, into the measured value D1(−my) indicating the moment My by use of the conversion data c1(measurement step). Next, based on the measured value D1 obtained in the measurement step, the calculating unit 51 of the force measuring device 5 obtains a value my indicating the moment My acting on the hand 3b of the other robot 102 due to a reaction generated by the abutting step (calculation step). Next, the calculating unit 51 of the force measuring device 5 updates the conversion data c2 such that the detected signal d2, outputted by the force sensor 2 of the other robot 102 in the abutting step, is converted into an identical value to the value my indicating the moment My, obtained in the calculation step (correction step). Thereby, the moment My of the force sensor 2 has been corrected. This also applies to the moment Mx.

3. Correcting Method for Force Fz and Moment Mz

FIG. 2C shows an example of a correcting method for the force Fz, and FIG. 2D shows an example of a correcting method for the moment Mz. In this case, as the abutting step, the robot 101 having the hand 3a mounted with the corrected force sensor 1 and the robot 102 having the hand 3b mounted with the force sensor 2 as the object to be corrected are moved so as to have plane-symmetrical postures with respect to an X-Y plane (virtual plane) P2. Correction of the force Fz is performed by moving the arm 4a in a Z direction and the arm 4b in a −Z direction, to generate a force of Fz. Correction of the moment Mz is performed such that, for example in the six-axis vertical multi-joint, a portion corresponding to an axis J6 is rotated, to generate a force of Mz.

Hereinafter, according to the present embodiment, the force sensor 2 as the object to be corrected is corrected with the corrected force sensor 1 taken as a reference. Therefore, at the time of correcting the force sensor 2, it is neither necessary to fit an end effector as a reference for acquiring reference data beforehand, nor to exchange the end effector. Accordingly, correction of the force sensor 2 is simplified, and the force sensor 2 can be corrected with high accuracy while remaining mounted at the end of the arm 4b.

It is to be noted that, although the Y-Z plane (virtual plane) P1 and the X-Y plane (virtual plane) P2 are considered as different virtual planes, they may be an identical virtual plane, and in this case, it may be the virtual vertical plane P shown in FIG. 1.

Herein, changes in the end effector and the arm, or the like, may occur due to a change in production process, or the like. When lengths of the end effector and the arm change, a contact point may be displaced from an assumed one, thereby leading to lower correction accuracy. As a countermeasure against that, shapes of the end effector and the arm may be included in the parameters of the robot controlling device and position correction may then be performed, but it requires time and trouble.

Accordingly, in the present embodiment, as shown in FIG. 1 and FIGS. 2A to 2D, the robot 101 mounted with the corrected force sensor 1 and the robot 102 mounted with the force sensor 2 as the object to be corrected are made to have plane-symmetrical postures with respect to the virtual vertical plane P, thereby bringing the hands 3a, 3b into contact with each other. Even when shapes of the hand 3a (3b) and the arm 4a (4b) are changed, the contact positions become plane-symmetrical, thereby facilitating the correction regardless of the shapes of the hand 3a (3b) and the arm 4a (4b). From the above, it is found possible to provide a simple method in which the force sensor 2 can be corrected while remaining mounted in the robot 102.

Next, there will be described a correcting method for the force sensor 2 as the object to be corrected in another embodiment. The correcting method shown so far has been a method for the force sensors 1, 2 with the same axis. However, the method is not restricted thereto, but correction of the force sensor 2 is possible so long as a force or a moment acting on the force sensor 2 as the object to be corrected can be measured.

Figure 3A:
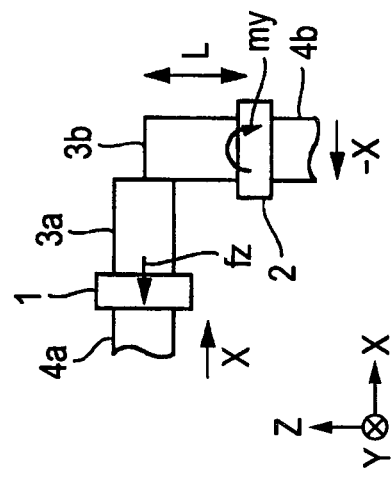
FIG. 3A is a view showing an example of a correcting method for correcting the force Fz of the force sensor as an object to be corrected by use of the force Fx acting on the corrected force sensor in the force sensors in another embodiment.
Figure 3B:
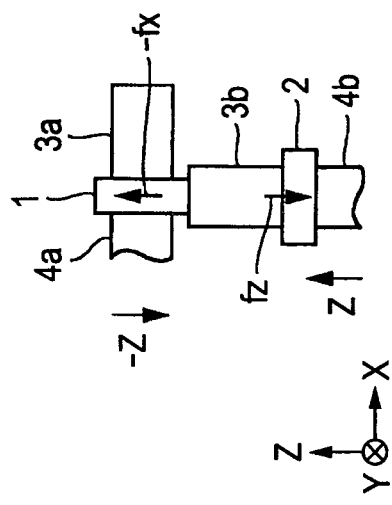
FIG. 3B is a view showing an example of a correcting method for correcting the moment My of the force sensor as the object to be corrected by use of the force Fx acting on the corrected force sensor in the force sensors in another embodiment.

FIGS. 3A and 3B are views each showing the correcting method for the force sensor 2 in another embodiment. Hereinafter, a description will be given with reference to FIGS. 3A and 3B. FIG. 3A shows an example of a correcting method for the force Fz of the force sensor 2 as the object to be corrected by use of the force Fx acting on the corrected force sensor 1. As the abutting step, the hand 3a mounted with the corrected force sensor 1 and the hand 3b mounted with the force sensor 2 as the object to be corrected are moved so as to be orthogonal to each other. Then, the arm 4a is moved in the −Z direction and the arm 4b is moved in the Z direction, to bring the hands 3a, 3b into contact with each other. Thereby, a force of −fx is generated in the corrected force sensor 1, and the force fz with the same magnitude as fx is generated in the force sensor 2 as the object to be corrected. This is used to correct the force sensor 2.

Specifically describing, the calculating unit 51 of the force measuring device 5 converts the detected signal d1 of the corrected force sensor 1 of the one robot 101, generated by execution of the abutting step, into the measured value D1(−fx) indicating the force Fx by use of the conversion data c1(measurement step). Next, based on the measured value D1(−fx) obtained in the measurement step, the calculating unit 51 of the force measuring device 5 obtains a value fz indicating the force Fz acting on the hand 3b of the other robot 102 due to a reaction generated by the abutting step (calculation step). Next, the calculating unit 51 of the force measuring device 5 updates conversion data c2 such that the detected signal d2, outputted by the force sensor 2 of the other robot 102 in the abutting step, is converted into an identical value to the value fz indicating the force Fz obtained in the calculation step (correction step).

Next, FIG. 3B shows an example of a correcting method for the moment My of the force sensor 2 as the object to be corrected through use of the force Fx on the corrected force sensor 1. As the abutting step, the hand 3a mounted with the corrected force sensor 1 and the hand 3b mounted with the force sensor 2 as the object to be corrected are moved so as to be orthogonal to each other. Then, the arm 4a is moved in the X direction and the arm 4b is moved in the −X direction, to bring the ends of the hands 3a, 3b into contact with each other. Thereby, the force Fz with the value fz is generated in the corrected force sensor 1, and the moment My with the value my is generated in the force sensor 2 as the object to be corrected. The magnitude of the value my of the moment My is: $my = fz \times L$, where the length of the hand 3b is L. This is used to correct the force sensor 2.

Specifically describing, the calculating unit 51 of the force measuring device 5 converts the detected signal d1 of the corrected force sensor 1 of the one robot 101, generated by execution of the abutting step, into the measured value D1(fz) indicating the force Fz by use of the conversion data c1(measurement step). Next, based on the measured value D1(fz) obtained in the measurement step, the calculating unit 51 of the force measuring device 5 obtains, by calculation of my=fz×L, the value my indicating the moment My acting on the hand 3b of the other robot 102 due to a reaction generated by the abutting step (calculation step). Next, the calculating unit 51 of the force measuring device 5 updates the conversion data c2 such that the detected signal d2, outputted by the force sensor 2 of the other robot 102 in the abutting step, is converted into an identical value to the value my indicating the moment My obtained in the calculation step (correction step). In such a manner, when the sensor is the six-axis sensor, there can be performed 36 (=6×6) different correcting methods.

Figure 4:
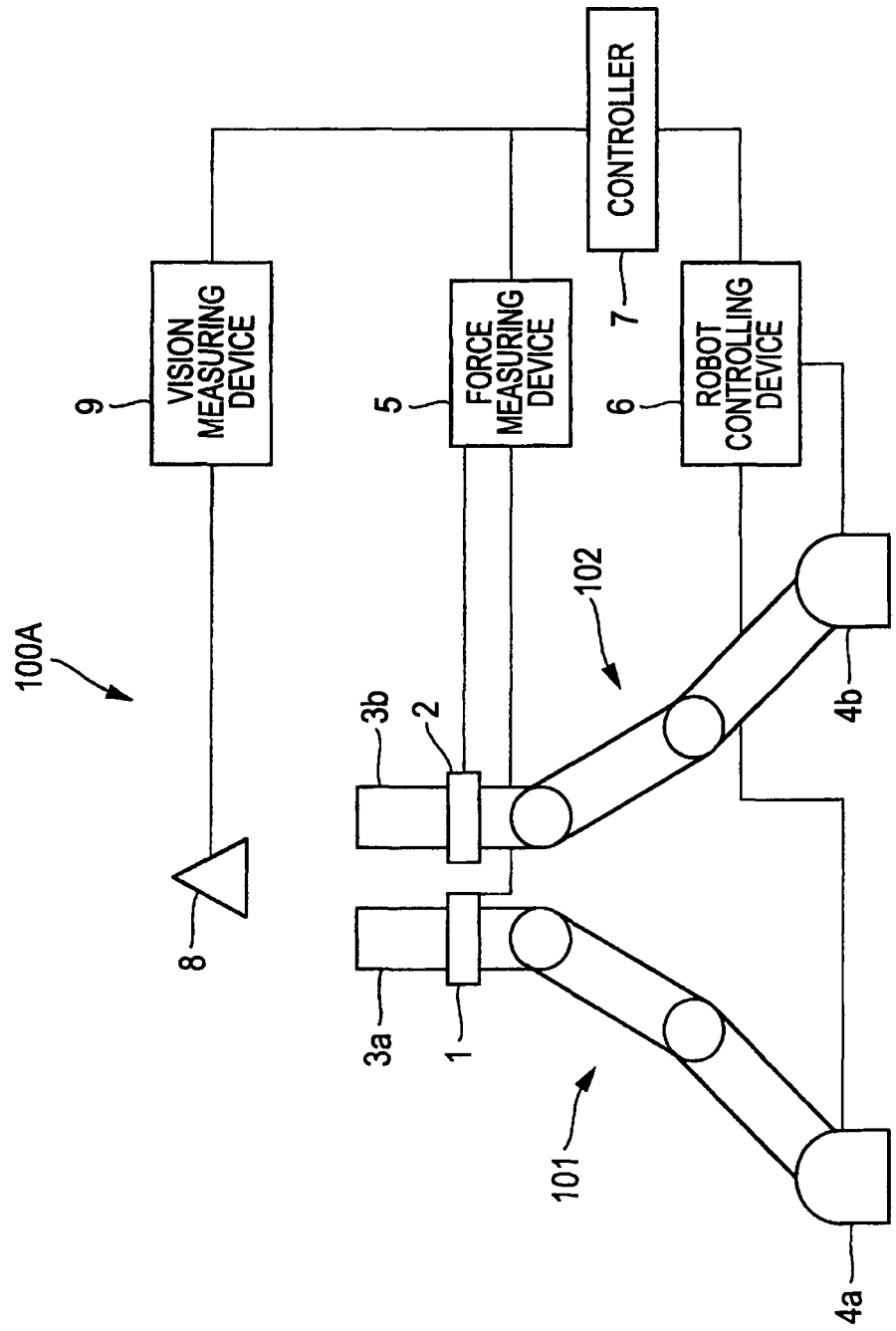
FIG. 4 is an illustrative view showing a schematic configuration of a robot system according to still another embodiment of the present invention.

Next, a correcting method for the force sensor in still another embodiment will be described. In this embodiment, position correction by means of a camera is used to correct the force sensor 2 as the object to be corrected. FIG. 4 is an illustrative view showing a schematic configuration of a robot system according to still another embodiment of the present invention. In the arm made up of a horizontal multi-joint, a vertical multi-joint, and the like, an error might occur with respect to a position command from the robot controlling device. Thereat, a robot system 100A shown in FIG. 4 includes similar devices to the respective devices shown in the robot system 100 of FIG. 1, and also includes a vision measuring device 9 that performs processing on a camera 8 and an image taken by the camera 8.

Figure 5A:
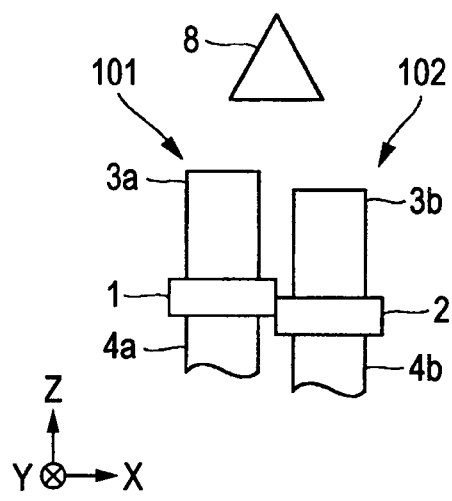
FIG. 5A is a view showing a state before position correction of the robot is performed in correction of the force sensor.
Figure 5B:
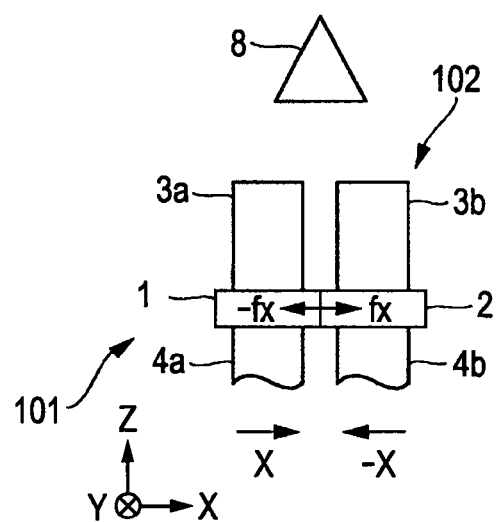
FIG. 5B is a view showing a state after the position correction of the robot has been performed in the correction of the force sensor.

FIGS. 5A and 5B are views for illustrating a correcting method for the force sensor, where FIG. 5A shows a state before position correction of the robots 101, 102 is performed, and FIG. 5B shows a state after position correction of the robots 101, 102 has been performed. In the abutting step, as shown in FIG. 5A, the hand 3a and the hand 3b may be displaced from a predetermined corrected position. Thereat, the camera 8 is used to perform position correction of the respective robots 101, 102 in the following procedure.

In the abutting step, first, the hands 3a, 3b of the pair of robots 101, 102 are imaged by the camera 8, to acquire images. The vision measuring device 9 processes the image transmitted from the camera 8, to calculate an error from the predetermined corrected position. That calculation result is transmitted to the controller 7, and position commands are given to the arms 4a, 4b through the robot controlling device 6, to perform position correction of the pair of robots 101, 102. Once again, images of the hands 3a, 3b are acquired with the camera 8, and when an error from the predetermined correcting position is within an allowable range, the position correcting operation is completed. Then, as shown in FIG. 5B, the hands 3a, 3b of the pair of robots 101, 102 are made to abut on each other. It should be noted that the measurement step, the calculation step and the correction step are similar to in the foregoing embodiments, and descriptions thereof thus will not be repeated.

In such a manner, correction including position correction of the hands 3a, 3b and the arms 4a, 4b with the camera 8 is performed, to make it possible to execute the correction operation for the force sensor 2 with higher accuracy.

Figure 6A:
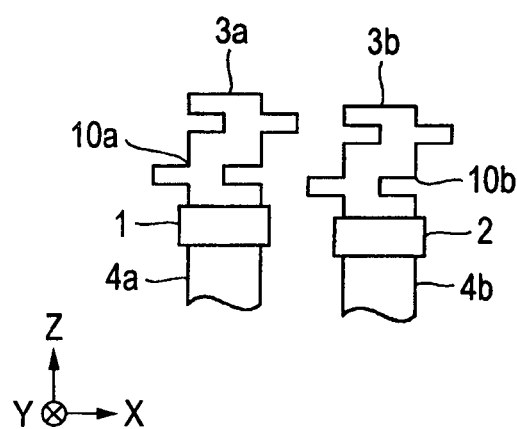
FIG. 6A is a view showing a state before position correction of the robot is performed in correction of the force sensor in still another embodiment.
Figure 6B:
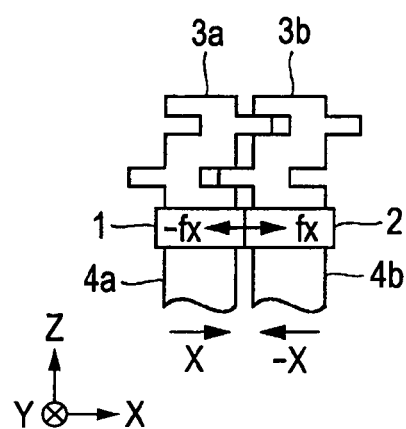
FIG. 6B is a view showing a state after the position correction of the robot has been performed in the correction of the force sensor in still another embodiment.

Next, a correcting method for the force sensor in still another embodiment will be described. FIGS. 6A and 6B are views for illustrating a correcting method for the force sensor in still another embodiment, where FIG. 6A shows a state before position correction of the robots 101, 102 is performed, and FIG. 6B shows a state after position correction of the robots 101, 102 has been performed. In this embodiment, concavo-convex units 10a, 10b for positioning, which can be fitted into each other, are formed in the respective hands 3a, 3b. Herein, the concavo-convex unit 10a of the hand 3a and the concavo-convex unit 10b of the hand 3b are designed so as to have a fitting tolerance being a position error within a correction accuracy allowable range.

In the abutting process, the controller 7 is manually operated such that the concavo-convex units 10a, 10b of the respective hands 3a, 3b are fitted into each other, to allow minor adjustment of the arms 4a, 4b through the robot controlling device 6. Thereby, positioning of the respective hands 3a, 3b is performed. As another method, the arm 4a can be activated by impedance control by use of the value of the corrected force sensor 1 of the hand 3a, which is generated at the time of the operation to fit the concavo-convex units 10a, 10b. Since the impedance control by means of the force sensor is a known technique, a description thereof will be omitted. With the impedance control performed manually or by means of the corrected force sensor 1, the position correcting operation is completed. It should be noted that the measurement step, the calculation step and the correction step are similar to in the foregoing embodiments, and descriptions thereof thus will not be repeated.

In such a manner, the concavo-convex units 10a, 10b of the hands 3a, 3b are used to perform positioning of the hands 3a, 3b, thereby to be able to execute the operation to correct the force sensor 2 with higher accuracy.

The present invention is preferably applicable to an industrial assembly robot, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-150245, filed Jun. 30, 2010, which is hereby incorporated by reference herein in its entirety.

The invention claimed is:

1. A force sensor correcting method in a robot system which includes a pair of robots each having an arm and an end effector provided at the end of the arm via a force sensor for sensing a force and a moment, the method comprising:

a first abutting step of making the force sensor of the pair of robots abut on each other by activating the pair of robots such that the respective robots have plane-symmetrical postures with respect to a virtual plane;

a first measurement step of obtaining a first value indicating a force of the force sensor of one robot and a second value indicating a force of the force sensor of the other robot, generated by execution of the first abutting step;

a first correction step of updating a first conversion data of the force sensor of the other robot, which converts the second value into the first value;

a second abutting step of making ends of the end effectors of the pair of robots abut on each other and making the force sensors of the pair of robots be spaced away from each other by activating the pair of robots such that the respective robots have plane-symmetrical postures with respect to the virtual plane;

a second measurement step of obtaining a third value indicating a moment of the force sensor of one robot and a fourth value indicating a moment of the force sensor of the other robot, generated by execution of the second abutting step; and a second correction step of updating a second conversion data of the force sensor of the other robot, which converts the fourth value into the third value.

2. The force sensor correcting method according to claim 1, wherein concavo-convex units that can be fitted into each other are formed in the respective end effectors, and
in the first abutting step, positioning is performed with the concavo-convex units of the respective end effectors being fitted into each other.

3. The force sensor correcting method according to claim 1, wherein in the first and second abutting steps, the pair of robots is imaged, to perform position correction of the pair of robots, and the end effectors of the pair of robots are made to abut on each other.

4. The force sensor correcting method according to claim 1, wherein the force sensor of the one robot is already corrected before performing the force sensor correcting method.

* * * * *